(12) United States Patent
Gotoh et al.

(10) Patent No.: US 6,705,725 B2
(45) Date of Patent: Mar. 16, 2004

(54) INJECTION COMPRESSION MOLDING METHOD FOR OPTICALLY MOLDED PRODUCTS

(75) Inventors: Kiyohito Gotoh, Chiyoda-ku (JP); Hiromi Ichioka, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/441,072

(22) Filed: May 20, 2003

(65) Prior Publication Data

US 2003/0201555 A1 Oct. 30, 2003

Related U.S. Application Data

(63) Continuation of application No. 09/673,624, filed as application No. PCT/JP99/02094 on Apr. 20, 1999, now Pat. No. 6,616,868.

(30) Foreign Application Priority Data

| Apr. 22, 1998 | (JP) | ........................................... | 10-111884 |
| Apr. 22, 1998 | (JP) | ........................................... | 10-111885 |
| Apr. 22, 1998 | (JP) | ........................................... | 10-111886 |

(51) Int. Cl.⁷ ................................................. G02C 7/02
(52) U.S. Cl. ........................ 351/159; 264/2.2; 425/808
(58) Field of Search ........................ 351/41, 159, 177; 264/2.2, 328.7, 328.8; 425/808; 356/601, 605

(56) References Cited

U.S. PATENT DOCUMENTS

| 4,540,534 | A |   | 9/1985 | Grendol | 264/2.2 |
| 4,560,342 | A | * | 12/1985 | Ishida et al. | 425/562 |
| 4,569,807 | A | * | 2/1986 | Boudet | 264/2.2 |
| 4,828,769 | A |   | 5/1989 | Maus et al. | 264/1.3 |
| 4,836,960 | A |   | 6/1989 | Spector et al. | 264/2.2 |
| 5,093,049 | A |   | 3/1992 | Uehara et al. | 264/2.2 |
| 5,552,094 | A |   | 9/1996 | Kubota | 264/2.2 |
| 5,814,251 | A |   | 9/1998 | Arai et al. | 264/2.2 |
| 5,993,723 | A |   | 11/1999 | Tanaka et al. | 264/500 |
| 6,270,698 | B1 | * | 8/2001 | Pope | 264/2.2 |
| 6,284,162 | B1 |   | 9/2001 | Kingsbury et al. | 264/2.2 |
| 2002/0008845 | A1 | * | 1/2002 | Pope | 351/159 |

FOREIGN PATENT DOCUMENTS

| DE | 19510385 A1 | 9/1995 |
| DE | 19739522 A1 | 4/1998 |
| EP | 0 640 460 A2 | 3/1995 |
| EP | 0-765722 A1 | 4/1997 |
| JP | 61-19409 | 5/1986 |
| JP | 62-083121 A | 4/1987 |
| JP | 62-179913 A | 8/1987 |
| JP | 63-216719 A | 9/1988 |
| JP | 01090176 A | 4/1989 |
| JP | 671755 | 9/1994 |
| JP | 09-057794 | 3/1997 |

* cited by examiner

Primary Examiner—Huy Mai
(74) Attorney, Agent, or Firm—Wenderoth, Lind & Ponack, L.L.P.

(57) ABSTRACT

A method of producing an optically molded product of a thermoplastic resin by injection compression molding, the method comprising the steps of:

(1) expanding the volume of a cavity more than the volume of the optically molded product of interest;

(2) injecting a molten thermoplastic resin into the cavity through an injection cylinder;

(3) compressing the expanded cavity to a prescribed thickness of the molded product;

(4) returning an excess of the thermoplastic resin produced by the compression into the injection cylinder; and (5) keeping the molten thermoplastic resin in the cavity until the molded product of interest is formed.

The present invention makes it possible to produce an optically molded product (for example, a spectacle lens) free from a weld line and excellent in surface accuracy using a metal mold having a simple structure industrially advantageously.

5 Claims, 8 Drawing Sheets

INJECTION COMPRESSION MOLDING METHOD FOR OPTICALLY MOLDED PRODUCTS

This application is a continuation of Ser. No. 09/673,624 filed Oct. 19, 2000 now U.S. Pat. No. 6,616,868, which is a U.S. national stage of International Application No. PCT/JP99/02094 filed Apr. 20. 1999.

DETAILED DESCRIPTION OF THE INVENTION

The present invention relates to a method of producing an optically molded product by injection compression molding. More specifically, it relates to a method of producing an optically molded product which is required to have excellent surface accuracy and optical properties, such as a spectacle lens, from a transparent thermoplastic resin such as a polycarbonate resin by injection compression molding.

PRIOR ART

Demand for plastic lenses has recently been growing. Plastic lenses are roughly divided into acrylic resin lenses produced by casting-thermosetting molding and thermoplastic resin lenses such as polycarbonate resin and polyacrylic resin lenses produced by injection molding.

Particularly, polycarbonate resin lenses have been attracting much attention as spectacle lenses which can be produced by injection molding and have a high refractive index, light weight, excellent ultraviolet light absorptive power and safety with impact resistance and have been used recently in large quantities.

There are proposed a large number of methods of producing spectacle lenses by injection molding. Known methods include one in which a semi-finish lens is produced by injection molding and shaped into an optical form of interest by cutting and polishing and one in which a lens having an optical form is obtained by a single injection molding process as a finish lens. Particularly, the latter case involves a basic problem caused by the form of a lens that when a concave lens is to be produced by injection molding, a molten resin from a gate flows fast in a portion corresponding to the peripheral portion of the lens because it is thick and slow in a portion corresponding to the center portion of the lens because it is thin in a cavity.

As a result, resin flows meet each other in the peripheral portion in the end, forming a weld line. This is marked as the focusing distance of the concave lens becomes shorter, thereby deteriorating the optical properties of the lens and greatly impairing the appearance of the lens. Depending on the outer diameter of a lens, the formation of the weld line which is a quality problem rarely occurs in lenses having a focusing distance of about −1 m or less. However, the formation of the weld line easily occurs in concave lenses having a focusing distance of −1 m or more, particularly concave lenses having a focusing distance of −0.5 m or more.

There are proposed various methods of solving the above problem caused by the injection molding of spectacle lenses. Out of the methods, typical methods for eliminating the weld line include one in which an overflow pocket is formed in a peripheral portion to limit a resin flow in the peripheral portion relatively as disclosed by JP-B 61-19409 (the term "JP-B" as used herein means an "examined Japanese patent publication"), one in which a side core is formed in a cavity as disclosed by JP-A 62-83121 (the term "JP-A" as used herein means an "unexamined published Japanese patent application"), and one in which very small irregularities are formed on the most peripheral portion of a lens to limit a resin flow in the peripheral portion as disclosed by JP-A 1-90716.

However, when the overflow pocket or the side core is formed in the cavity, the structure of a metal mold becomes complex, the peripheral portion of a powerful concave lens (may be referred to as "minus lens") becomes very thick, and a weld line cannot be eliminated substantially in these methods.

Since a flow of a molten resin in the cavity is disturbed in the methods in which the side core or irregularities are formed in the cavity, a molding defect such as a flow mark or a cold flow is easily induced and the releasability of a lens molded product is impaired. A cylindrical surface or toric surface on the most peripheral portion of which changes in thickness cannot be formed with these methods.

Further, as the production of a spectacle lens by injection molding is generally carried out by a method of molding a great quantity and multiple types of spectacle lenses at the same time, it is very complicated to attach and detach accessories to and from the cavity, thereby greatly limiting the type of spectacle lenses which can be molded.

Although a multi-stage compression method makes it possible to obtain a lens having excellent surface accuracy, the formation of a weld line cannot be prevented basically because the amount of a resin corresponding to the amount of shrinkage is filled.

Thus, there are proposed a large number of methods of preventing the formation of a weld line, such as one in which the temperature of a metal mold is controlled in a complicated manner and one making use of ultrasonic waves. However, these methods involve such problems as the complex structure of a metal mold and the limited design of a lens. A method of molding an optical lens having substantially no weld line is not yet to be established.

When a finish lens is to be produced by injection molding, a distortion or a reduction in surface accuracy is easily caused by the shrinkage of a resin due to solidification by cooling. This phenomenon is more marked as the shrinkage difference of a molded product having a large thickness difference becomes larger. To eliminate a shrinkage difference caused by solidification by cooling, there is a typical one as disclosed by JP-B 6-71755 in which a multi-stage compression method is carried on while the amount of a resin equivalent to the amount of shrinkage is filled in advance. However, this method has such problems as insufficient surface accuracy and large differences among molded products. The expression "surface accuracy" as used herein means whether surface curvature, flatness and the like fall within designed standard ranges.

These known injection compression molding methods have the following two defects. One of the defects is that a sufficient injection resin pressure is not applied at the time of the completion of injection when the surface layer of a molded product which exerts a great influence upon the surface accuracy and optical distortion of the molded product is formed because a resin is filled into a cavity and a sufficient injection resin pressure is not applied at the time of injection. Therefore, a distortion or poor surface accuracy results. The expression "optical distortion" as used herein means an optical distortion which can be easily observed with the naked eye, an optical distortion which can be observed from an image of a fluorescent light reflected on the surface of a lens, an optical distortion which can be seen as a thin ring form by a polarizing plate, or the like. These defect phenomena can be easily discovered the most by observation with a polarizing plate. These are fatal defects when the molded product is used as a lens. These defect phenomena easily occur in the central portion of a plus lens and the peripheral portion of a minus lens. The cause of these phenomena is mainly that a sufficient resin pressure cannot be applied to the inside of the cavity at the time of the completion of injection when the surface layer of a lens is formed.

The second defect is that the filled state of a resin in the injection step of an injection molding machine includes differences in the injection step or differences in the metering step and the state of a resin in the cavity before compression often greatly differs for each molding shot. Therefore, there often produced differences above a tolerable range from the viewpoint of the quality control of an optically molded product. The injection compression molding of the prior art is greatly affected by the differences.

Problem to be Solved by the Invention

It is therefore a first object of the present invention to provide a method of molding an optically molded product which has no weld line or a very small weld line if it is formed.

It is a second object of the present invention to provide a method of molding an optically molded product having excellent surface accuracy.

It is a third object of the present invention to provide a method of molding an optically molded product, which facilitates molding multiple kinds and a large quantity of molded products at the same time without using a cavity having a complex shape.

It is another object of the present invention to provide a method of molding an optically molded product, which has small differences of quality molded products and which can mold a high-quality molded product stably and industrially advantageously.

It is a further object of the present invention to provide a method of molding an optically molded product economically advantageously.

Means for Solving Problems

According to studies conducted by the inventors of the present invention, the above objects of the present invention are attained by a method of producing an optically molded product of a thermoplastic resin by injection compression molding, the method comprising the steps of:

(1) expanding the volume of a cavity more than the volume of the optically molded product of interest;
(2) injecting a molten thermoplastic resin into the cavity through an injection cylinder;
(3) compressing the expanded cavity to a prescribed thickness of the molded product;
(4) returning an excess of the thermoplastic resin produced by the compression into the injection cylinder;
(5) keeping the molten thermoplastic resin in the cavity until the molded product of interest is formed; and
(6) taking out the obtained molded product from the cavity.

This molding method will be referred to as "first molding method" hereinafter.

Further, according to studies conducted by the inventors of the present invention, the above objects of the present invention are attained by a method of producing an optically molded product of a thermoplastic resin by injection compression molding, the method comprising the steps:

(1) expanding the volume of a cavity more than the volume of the optically molded product of interest;
(2) injecting a molten thermoplastic resin into the cavity through an injection cylinder;
(3) compressing the expanded cavity to a prescribed thickness of the molded product or a thickness 200 $\mu$m smaller than the thickness;
(4) adjusting or changing resin pressure in the injection cylinder and compression pressure in the cavity in limits that the change width does not exceed 100 $\mu$m from the prescribed thickness of the molded product to achieve the prescribed thickness of the molded product in the end;
(5) keeping the molten thermoplastic resin in the cavity until the molded product of interest is formed; and
(6) taking out the obtained molded product from the cavity.

This molding method will be referred to as "second molding method" hereinafter.

The expression "optically molded product" as used herein denotes an optically molded product obtained by forming an image of an object using light refraction and reflection and diverging or converging a pencil of rays, or an optically molded product obtained making use of an interference phenomenon or divergence caused by the phase difference of laser beams. Illustrative examples of the optically molded product include plastic spectacle lenses and projector lenses. The present invention is particularly advantageous for the molding of a polycarbonate resin spectacle lens.

Since a resin is shut off from a runner by such means as a gate seal and then a cavity is compressed in the injection compression molding method of the prior art, an excess of the resin is stored in an overflow pocket or the like. Since a small amount of the filled resin for making up for the amount of shrinkage is existent, a complex metal mold structure is required for inhibiting the forming of weld line to provide a side core or irregularities, control the temperature of a metal mold or make an ultrasonic treatment.

The inventors of the present invention ventured to study means of returning a molten resin into the injection cylinder, which has been considered inappropriate in the prior art injection molding technology, and could establish an injection compression molding method which can handle a small excess or large excess of the resin with very simple means and rarely forms a weld line for a lens having any shape.

REFERENCE SYMBOLS

Figure 1:
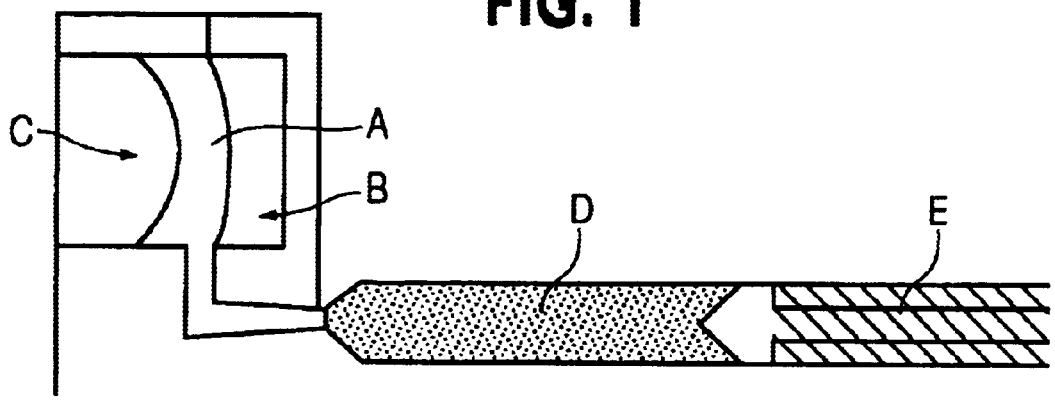
FIG. 1 is a schematic diagram showing a cavity which is expanded more than the volume of an optically molded product before injection.

A. expanded cavity
B. mirror surface on fixed side
C. mirror surface on movable side
D. molten resin
E. screw
F. compressed cavity
1. mirror surface on fixed side
2. mirror surface on movable side
3. cavity
4. compression control rod
5. die set on fixed side
6. space having a width equivalent to amount of compression
7. ejector plate
8. pedestal
9. compression plate
10. compression force
11. counter force
12. magnetic scale
13. resin pressure
14. amount of compression
15. compression pressure
16. resin pressure
17. compression pressure time in compression step
18. resin pressure time in compression step
19. time of compression step
20. resin pressure in compression step
21. compression pressure in compression step
22. resin pressure in dwelling step
23. compression pressure in dwelling step
24. change width in amount of compression after compressed to predetermined thickness
25. amount of return from compression
26. returning step
27. resin pressure multi-stage control unit
28. injection pressure multi-stage control unit
29. positional relationship between eye and sample for evaluation of fluorescent lamp
30. fluorescent lamp
31. polarizing plate whose polarization planes cross each other
32. sample (optically molded product)
33. frosted glass
34. fluorescent lamp
35. sample (minus lens)
36. length of weld line
37. time of dwelling step The molding method of the present invention will be described in more detail hereinunder.

The injection molding machine used in the present invention is not particularly limited but it has required clamping force as the basis of the injection molding of an optically molded product and desirably has a unit capable of controlling injection, compression and dwelling in multiple stages with high accuracy. The screw unit may have any shape if it has a counter-flow prevention unit. This molding machine may be of any type such as an in-line screw type or plunger type.

The metal mold used in the present invention is not particularly limited if it can be used for compression molding. It can be used for a clamping compression method making use of the opening and closing of a platen (plate for attaching a metal mold) or a core compression method using the compression cylinder of the platen of a molding machine or ball screw. The core compression method is preferred because the cavity must be opened wide to completely eliminate a weld line.

The clamping compression method is a method in which the parting surfaces of a fixed mold and a movable mold are separated from each other with a predetermined interval therebetween to open a metal mold, a resin is injected, the parting surfaces are contacted to each other by clamping force, and a cavity is compressed. The core compression method is a method in which the parting surfaces of a fixed mold and a movable mold are contacted to each other by clamping before injection, a resin is injected by applying predetermined clamping force, and then a cavity is compressed. In the compression step after injection, a mirror surface on the movable side is moved forward in a direction that the volume of the cavity is reduced for compression by means of a compression unit installed in a molding machine, the metal mold or the like. The compression unit is a hydraulic cylinder, ball screw or the like.

In the molding method of the present invention, as a complex unit such as an overflow pocket or side core does not need to be installed in the metal mold, a metal mold having a very simple structure can be used.

The thermoplastic resin used in the present invention is a transparent resin such as a polycarbonate resin, polyacrylic resin or modified polyolefin resin. Out of these, a polycarbonate resin is the most preferred as a raw material for optically molded products, particularly spectacle lenses.

The polycarbonate resin which can be used in the present invention is obtained by interfacial polymerization or ester interchange and has a viscosity average molecular weight of 17,000 to 40,000, preferably 20,000 to 30,000. Since optically molded products, particularly spectacle lenses are precision molded products, it is important to provide a prescribed curvature and diopter by transferring the mirror surface of a metal mold accurately, and a resin having low viscosity with excellent melt flowability is desired. However, if the viscosity of the polycarbonate resin is too low, impact strength which is the characteristic property of the polycarbonate resin cannot be retained. The expression "viscosity average molecular weight (M)" as used herein is obtained from the following Schnell's equation based on the intrinsic viscosity [η] of a solution measured at 20° C. in a methylene chloride solvent using an Ostwald's viscometer.

$$[\eta]=1.23\times10^{-4} M^{0.83}$$

A bisphenol used to produce the polycarbonate resin is particularly preferably bisphenol A. However, polycarbonate resins obtained by polymerizing other known phenols are acceptable.

The polycarbonate resin used in the present invention is an aromatic polycarbonate resin obtained by reacting a diphenol and a carbonate precursor. Illustrative examples of the diphenol include bis(hydroxyaryl)alkanes such as 2,2- bis(4-hydroxyphenyl)propane (so-called bisphenol A), bis (4-hydroxyphenyl)methane, 1,1-bis(4-hydroxyphenyl) ethane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-3-methylphenyl) propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyphenyl) cycloalkanes such as 1,1-bis(hydroxyphenyl)cyclopentane and 1,1-bis(hydroxyphenyl)cyclohexane; dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. These diphenols may be used alone or in combination of two or more.

Preferably, the polycarbonate resin contains 2,2-bis(4-hydroxyphenyl)propane (bisphenol A), out of the above diphenols, as the main diphenol component. Particularly preferably, the polycarbonate resin contains bisphenol A in an amount of 70 mol % or more, particularly 80mol % or more based on the total of all the diphenol components. The most preferred is an aromatic polycarbonate resin whose diphenol component is substantially composed of bisphenol A.

A brief description is given of interfacial polymerization or ester interchange for the production of the polycarbonate resin. In the interfacial polymerization in which phosgene is used as the carbonate precursor, a reaction between a diphenol component and phosgene is generally carried out in the presence of an acid binder and an organic solvent. An alkali metal hydroxide such as sodium hydroxide or potassium hydroxide, or an amine compound such as pyridine is used as the acid binder. A hydrocarbon halide such as methylene chloride or chlorobenzene is used as the organic solvent. A catalyst such as a tertiary amine or quaternary ammonium salt may be used to promote the reaction. A terminal capping agent such as an alkyl-substituted phenol exemplified by phenol or p-tert-butylphenol is desirably used as a molecular weight control agent. The reaction temperature is generally 0 to 40° C., the reaction time is several minutes to 5 hours, and pH is preferably maintained at 10 or more during the reaction.

The ester interchange (melting method) using a carbonic acid diester as the carbonate precursor is to distill out an alcohol or phenol formed by stirring under heating a diphenol component and a carbonic acid diester in a predetermined ratio in the presence of an inert gas. The reaction temperature which differs according to the boiling point of the formed alcohol or phenol is generally 120 to 330° C. The reaction is carried out while the alcohol or phenol formed by reducing the pressure from the beginning of the reaction is distilled out. A general ester interchange reaction catalyst may be used to promote the reaction. The carbonic acid diester used for the ester interchange reaction is, for example, diphenyl carbonate, dinaphthyl carbonate, dimethyl carbonate, diethyl carbonate, dibutyl carbonate or the like, out of which diphenyl carbonate is particularly preferred.

A parting agent may be blended into the polycarbonate resin of the present invention, which provides a preferred result. The parting agent is generally a saturated fatty acid ester such as a monoglyceride exemplified by monoglyceride stearate, low fatty acid ester exemplified by stearil stearate, higher fatty acid ester exemplified by behenate sebacate or erythritol ester exemplified by pentaerythritol tetrastearate. The parting agent is used in an amount of 0.03 to 1 part by weight based on 100 parts by weight of the polycarbonate resin. A phosphorous acid ester-based heat stabilizer may be used in an amount of 0.001 to 0.1 part by weight based on 100 parts by weight of the polycarbonate resin as required. The phosphorous acid ester-based heat stabilizer is preferably tris(nonylphenyl)phosphite, triphenyl phosphate, tris(2,4-di-tert-butylphenyl)phosphite, tetrakis(2, 4-di-tert-butylphenyl)-4,4'-biphenylene diphosphonite, bis-(2,6-di-tert-butyl-4-methylphenyl)pentaerythritol-di-phosphate, bis(2,4-di-tert-butylphenyl)pentaerythritol-di-phosphite, tris(ethylphenyl)phosphite, tris(butylphenyl) phosphite or tris(hydroxyphenyl)phosphite, particularly preferably tris(nonylphenyl)phosphite or tetrakis(2,4-di-tert-butylphenyl)-4,4'-biphenylene diphosphonite.

An ultraviolet light absorber may further be blended into the polycarbonate resin of the present invention to improve weatherability and cut harmful ultraviolet light. The ultraviolet light absorber is, for example, a benzophenone-based ultraviolet light absorber typified by 2,2'-dihydroxy-4-methoxybenzophenone, or benzotriazole-based ultraviolet light absorber typified by 2-(3-tert-butyl-5-methyl-2-hydroxyphenyl)-5-chlorobenzot riazole, 2-(3,5-di-tert-butyl-2-hydroxyphenyl)-5-chlorobenzotriazole, 2,2'-methylenebis[4-(1,1,3,3-tetramethylbutyl)-6-(2H-ben zotriazol-2-yl)phenol], 2-[2-hydroxy-3,5-bis(α,α-dimethylbenzyl)phenyl]-2H-benzo triazole or 2-(3,5-di-tert-amyl-2-hydroxyphenyl)benzotriazole. They may be used alone or in combination of two or more. Out of these ultraviolet light absorbers, benzotriazole-based ultraviolet light absorbers are preferred.

A bluing agent may further be blended into the polycarbonate resin of the present invention to cancel the yellow tint of a lens based on the polycarbonate resin and the ultraviolet light absorber. Any bluing agent may be used without a problem if it is used for a polycarbonate resin. An anthraquinone-based dye which is easily acquired is generally preferred.

The first molding method of the present invention will be described with reference to FIGS. 1 to 3.

Figure 2:
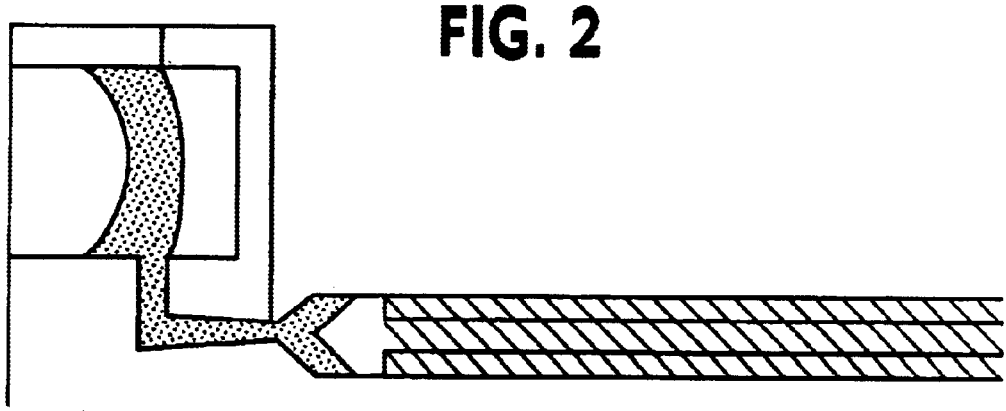
FIG. 2 is a schematic diagram showing that a molten thermoplastic resin is injected into the expanded cavity.
Figure 3:
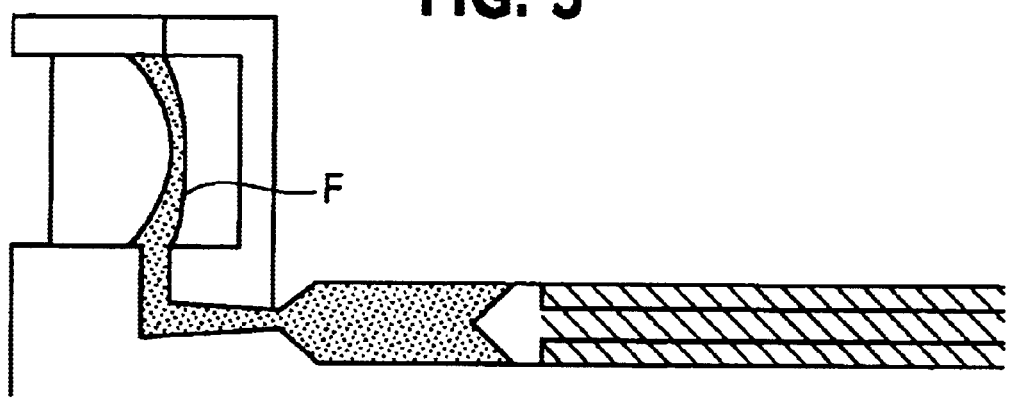
FIG. 3 is a schematic diagram showing that the expanded cavity is compressed to a prescribed thickness (center thickness) to return an excess of the molten thermoplastic resin into an injection cylinder.

FIG. 1 is a schematic diagram showing a cavity A which has been expanded more than the volume of an optically molded product before injection, FIG. 2 is a schematic diagram showing that a molten thermoplastic resin is injected into the expanded cavity A, and FIG. 3 is a schematic diagram showing that the expanded cavity is compressed to a prescribed thickness (center thickness) to return an excess of the molten thermoplastic resin into an injection cylinder.

Since a weld line is formed on an optically molded product having a thickness difference, attention has been paid to the ratio of the smallest thickness to the largest thickness of an optically molded product, for example, the thickness of the center portion (smallest thickness) to the thickness of the peripheral portion (largest thickness) of a concave lens in the present invention. When the ratio of the smallest thickness to the largest thickness which is given by the following equation (100×largest thickness/smallest thickness) is 150% or more, particularly more than 300% though it differs according to the shape of an optically molded product, a weld line is formed.

When an excess of the resin is returned into the injection cylinder after the cavity is expanded before injection to such a limit level that a weld line is rarely formed, that is, the above ratio becomes smaller than 150%, preferably 140% or less and then filled with a molten resin, an optically molded product, for example, a lens almost free from a weld line is obtained even when it is a concave lens having a short focusing distance. The return of the resin into the cylinder can be confirmed from an increase in the measurement value of an injection stroke measuring instrument attached to an injection unit in a direction opposite to the injection direction of the resin.

The compression amount of the cavity, which differs according to molding conditions such as the type and design value of typical thickness (thickness of a center portion in the case of a concave lens) of an optically molded product, the temperature of the cylinder and the temperature of the metal mold, the molding machine used, the metal mold and the like must be made larger as the focusing distance of a concave lens which is a typical example of the optically molded product becomes shorter. As for the volume of the expanded cavity at the time of injection based on the volume of the lens, the expansion volume ratio calculated from the following equation is preferably in the range of 110 to 500% from the viewpoints of the surface accuracy (surface deformation, etc.), optical properties (focusing distance, aberration, etc.) and molding ease of an optically molded product. It is more preferably in the range of 120 to 400%, particularly preferably 150 to 350%. When the expansion volume ratio is more than 500%, the amount of the resin to be exhausted becomes large, whereby required compression pressure may rise, the heat resistance of the molten resin may deteriorate or a molding failure may occur. The amount of compression caused by compression denotes a difference in typical thickness between the optically molded product before compression and the optically molded product after compression. expansion volume ratio (%)=100×(volume of expanded cavity/volume of compressed cavity) The volume of the expanded cavity and the volume of the compressed cavity are expressed in the unit of ml.

The preferred range of the expansion volume ratio is also affected by the above thickness ratio when a concave lens is molded. For example, the expansion volume ratio is preferably in the range of 110 to 200% when the thickness ratio is small (for example, 300% or less) and 200 to 500% when the thickness ratio is larger than that.

In the molding method of the present invention, the cavity must be expanded to such a limit level that a weld line is not formed or is allowable in a molded product before the completion of the injection step before compression. It is difficult to completely eliminate a weld line formed before compression by any means. That is, the cavity must be expanded before injection to such a limit level that the weld line is not formed or is allowable.

When the cavity is expanded to a predetermined thickness and a lens is cooled without compression and taken out from the cavity, it can be checked whether a weld line is formed before compression. As the amount of compression is smaller, molding becomes easier, and it is preferred that the amount of compression can be controlled from the viewpoint of the structure of the metal mold.

In the present invention, an excessive amount of a molten resin is filled based on the weight of an optically molded product in the injection step. Right after the completion of filling, the cavity is compressed to a prescribed center thickness in a short period of time. This compression time differs according to the type of the filling resin and molding conditions but it is preferably 5 seconds or less. When the time is longer than 5 seconds, the molten resin is cooled and an extremely high compression pressure is required due to a rise in the viscosity of the resin.

The expression "prescribed thickness" as used here denotes a thickness within a standard range of thickness which is typified from the viewpoint of the quality control of an optically molded product. For example, the thickness is the thickness of the center portion of a lens or the average thickness at a mirror surface of a lens.

The volume of the cavity is reduced by making the resin pressure lower than the pressure in the cavity resulting from compression after the completion of injection and compressing the cavity and an excess of the molten resin flows back into the injection cylinder from a gate through a runner and a sprue. This resin which has flown back is kneaded with a resin which is plasticized in the next cycle and re-injected.

After the completion of compression, the resin is cooled while the shrinkage amount of the molten resin is made up for by dwelling to obtain a molded product.

When the above first molding method is to be carried out, the inventors of the present invention have found that an optically molded product having no optical distortion even when it is a lens having a large thickness difference and extremely small differences in quality among products can be obtained by setting the resin pressure in the injection cylinder to a range of 39 to 150 MPa, preferably 60 to 120 MPa and then reducing the volume of the expanded cavity to a prescribed volume after a molten thermoplastic resin is injected into the cavity through the injection cylinder. That is, it is possible to mold a high-quality optically molded product stably by setting the resin pressure to the above range.

In other words, in the above molding method, the molten thermoplastic resin is filled into the expanded cavity, the cavity is filled with the resin, the resin pressure obtained by calculating the hydraulic pressure of the injection cylinder from the ratio of the square of the diameter of the hydraulic injection cylinder to the square of the diameter of the screw or the resin pressure measured with a pressure sensor reaches 39 to 150 MPa as the predetermined pressure, and then the compression step begins. The resin pressure is preferably in the range of 60 to 120 MPa. When the injection resin pressure is less than 39 MPa, an optical distortion is easily produced in a molded product. The pressure set at this point differs according to the shape of the optically molded product, the shape of the metal mold, the resin used, the molding machine and the like.

When the cavity is expanded before injection to such a limit level of the above ratio that a weld line, an optical distortion or surface defect is rarely produced as described above, the molten resin is filled at the above resin pressure, and an excess of the resin is returned into the injection cylinder, an optically molded product, for example, a lens almost free from a weld line, optical distortion and surface defect can be obtained even when it is a concave lens having a short focusing distance. The return of the resin into the cylinder can be confirmed from an increase in the measurement value of an injection stroke measuring instrument attached to an injection unit in a direction opposite to the injection direction of the resin.

As described above, the compression step begins after the resin pressure in the injection cylinder reaches a predetermined pressure before compression by setting the resin pressure to the above range. Therefore, a sufficient pressure is applied to the surface layer of a molded product at the time of solidification, there are almost no differences in pressure applied to the resin in the cavity before compression, and an optically molded product has no optical distortion and little differences.

A detailed description is subsequently given of the second molding method of the present invention. The second molding method comprises the following steps (1) to (6) as described above:

(1) expanding the volume of a cavity more than the volume of an optically molded product of interest;
(2) injecting a molten thermoplastic resin into the cavity through an injection cylinder;
(3) compressing the expanded cavity to a prescribed thickness of the molded product or a thickness 200 μm smaller than the thickness;
(4) adjusting or changing resin pressure in the injection cylinder and compression pressure in the cavity in limits that the change width does not exceed 100 μm from the prescribed thickness of the molded product to achieve the prescribed thickness of the molded product in the end;
(5) keeping the molten thermoplastic resin in the cavity until the molded product of interest is formed; and
(6) taking out the obtained molded product from the cavity.

The second molding method is characterized in that the molten resin injected into the expanded cavity is compressed to a predetermined thickness (or smaller than that) and then the resin pressure in the injection cylinder is controlled or changed to a predetermined range as shown in the steps (2) to (4).

Figure 4:
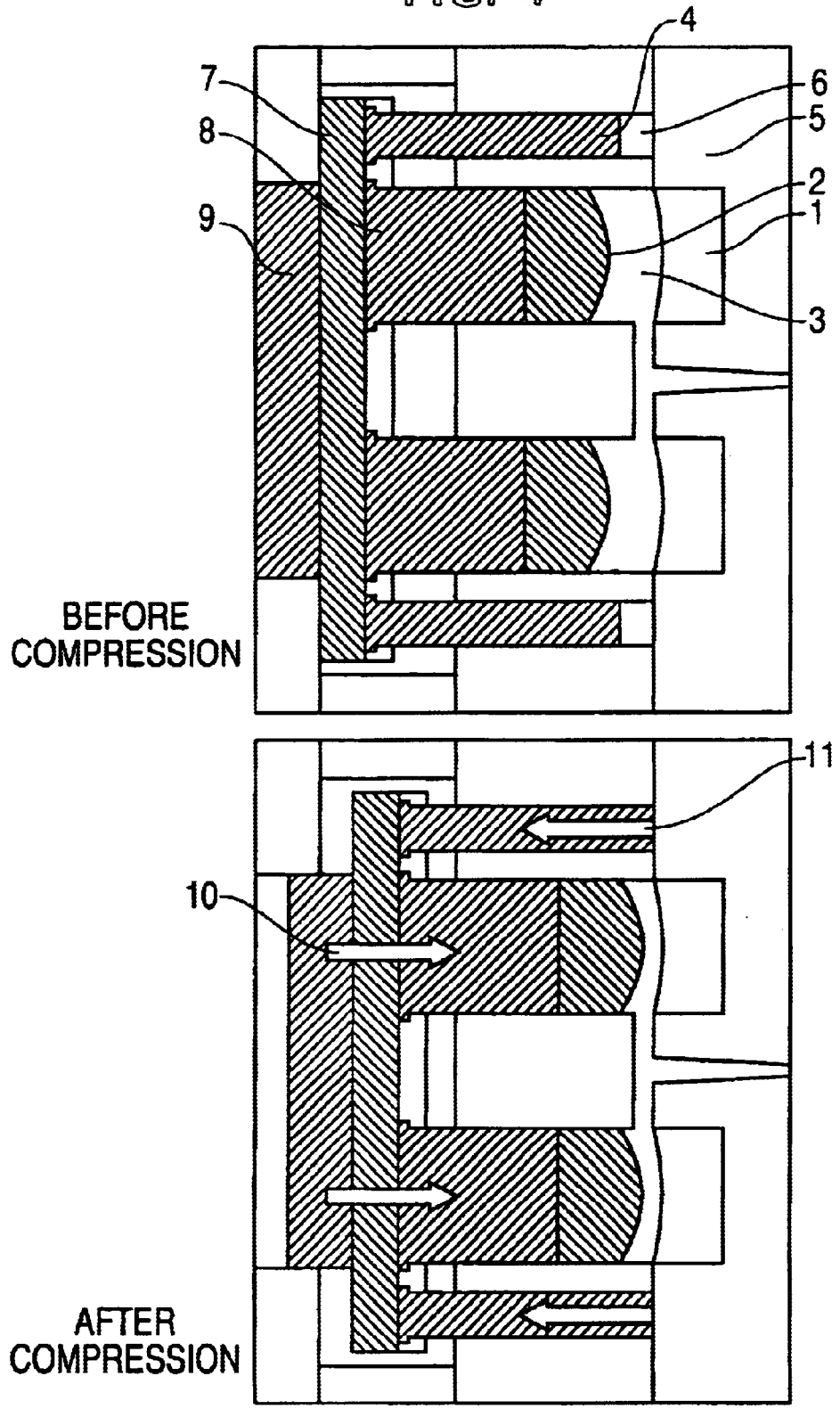
FIG. 4 is a conceptual diagram of the injection compression molding method of the prior art.
Figure 5:
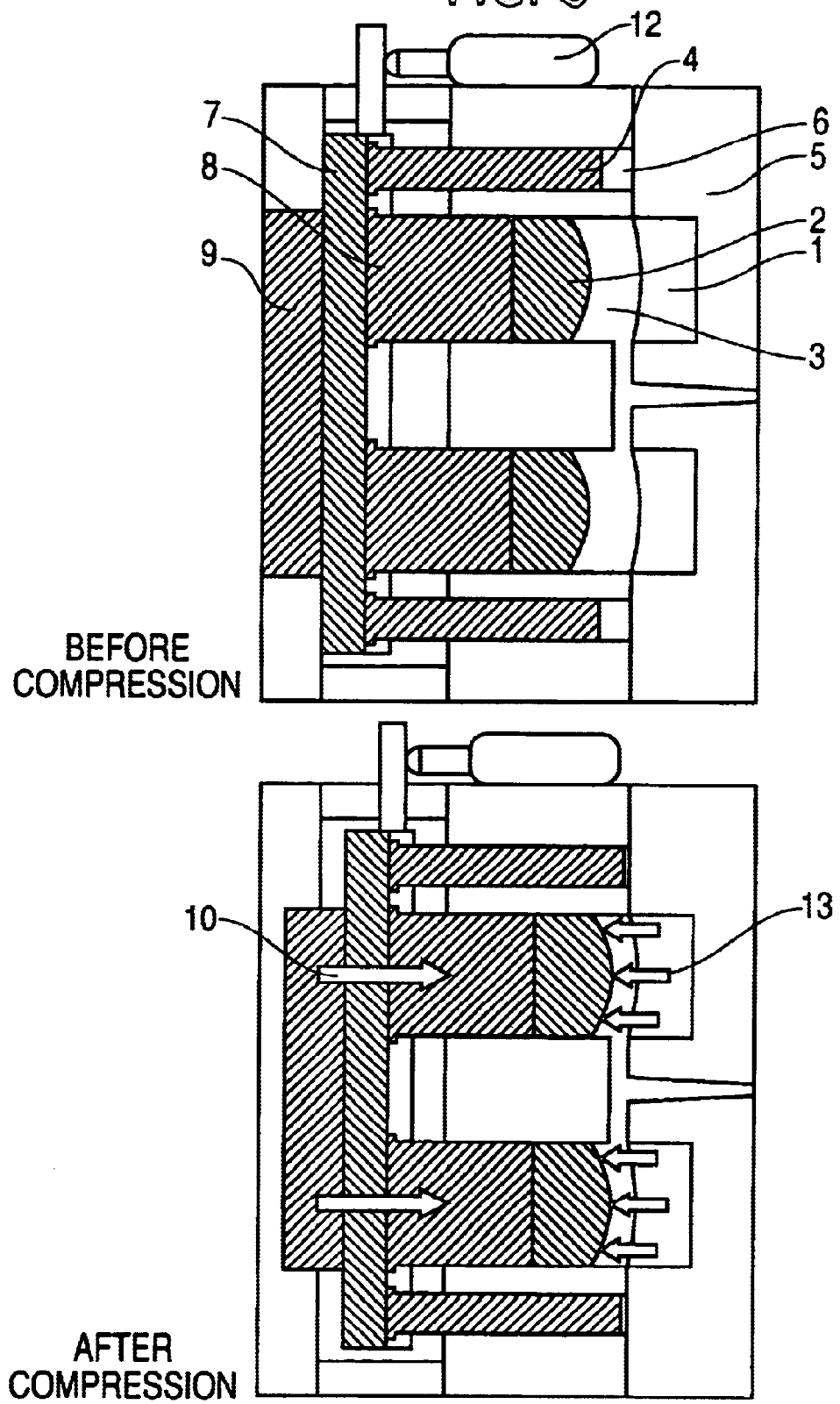
FIG. 5 is a conceptual diagram of the injection compression molding method of the present invention.

In the prior art, when an optically molded product obtains a predetermined thickness as shown in FIG. 4, counter force 11 is generated from a die set by contact between a compression control rod 4 and the die set 5. Therefore, compression force 10 is not completely applied to the cavity 3 and a change in compression force 10 is absorbed as counter force 11 even when the compression force 10 is changed or controlled, whereby it is not reflected as the pressure of the cavity 3 during molding. Therefore, pressure is not completely applied to a portion far from the gate or a thick portion, causing surface deformation. The concept of the second molding method of the present invention is shown in FIG. 5. In the second method, counter force against the compression force 10 is generated not from a mold structural part but by the resin pressure 13 from the injection cylinder. Therefore, the compression pressure 10 is fully transmitted to the cavity, and when the compression pressure 10 is changed or controlled, it is directly reflected as the pressure of the cavity. In the compression step, the resin pressure 13 is set to a level lower than the compression pressure 10 to compress the cavity. Thereafter, after the typical thickness of the cavity reaches a predetermined thickness of an optically molded product, the typical thickness of the cavity is controlled within a prescribed range of a predetermined thickness of an optically molded product in the end by controlling or changing the resin pressure and the compression pressure. The control of the pressure in the cavity 3 by the compression pressure 10 in the dwelling step which cannot be attained in the prior art is possible in the present invention and sufficient compression pressure can be secured.

The expression "compression step" as used herein denotes a step in which the typical thickness of the expanded cavity is compressed to a predetermined thickness or a thickness 200 μm smaller than the predetermined thickness, preferably a thickness 20 to 180 μm smaller than the thickness. The expression "dwelling step" as used herein denotes a step from the end of the compression step to the metering of an injection molding machine.

Compression force of several tens to several hundreds of tons, which differs according to the type, size and number per shot of optically molded products must be supported by the compression control rod in the compression step and the dwelling step in the prior art. Therefore, the compression control rod 4 must have sufficient buckling strength. The contact portions of the compression control rod 4 and the die set 5 must have sufficient strength against elastic deformation. An ejector plate must have sufficient strength against flexure stress. Therefore, metal mold parts becomes large in size and a high-strength expensive material is necessary. As a result, the metal mold becomes large in size and expensive. Along with an increase in the size of the metal mold, a larger-sized molding machine is required, boosting costs. Since counter force against the compression force 10 is generated by the resin pressure 13 in the second molding method of the present invention, the sufficient strengths of the movable mirror surface 2, pedestal 8, ejector plate 7 and compression plate 9 against compression stress must be taken into consideration. Therefore, excessive strength is not required, thereby making it possible to reduce the size of the metal mold. The calculation of the strength of the metal mold is easy.

As for the basic difference between the second method of the present invention and the method of the prior art, the space of the compression control rod 4 is made equal to the amount of compression in the prior art whereas the space is made larger than the amount of compression in the second method of the present invention. Thereby, even when the cavity is compressed by a predetermined amount, the resin pressure 13 is applied while the control rod and the die set on the fixed side are not contacted to each other to be well balanced with the compression pressure 10 to control the amount of compression, thereby controlling the typical thickness of an optically molded product.

The expression "predetermined thickness" as used herein denote a thickness within a prescribed range of typified thickness from the viewpoint of the quality control of an optically molded product. The typical thickness is the thickness of the center portion of a lens, the thickness of the peripheral portion of a lens or the average thickness of a mirror surface and differs according to the shape of an optically molded product.

The expression "amount of compression" as used herein denotes a difference between the typical thickness of the cavity before compression and the typical thickness of the cavity during or after compression.

The expression "compression pressure" as used herein denotes a value obtained by converting compression force generated from the compression unit of a molding machine or metal mold into pressure to be received by the cavity. As for how to calculate the value, the value is obtained by dividing compression force generated from the compression unit of a molding machine or a metal mold, by the projection area of a portion which is movable at the time of compression and contacted to the resin in the direction of the platen. The maximum compression force is determined by the designs of the compression units of a molding machine and a metal mold. The projection area of the portion which is movable at the time of compression and contacted to the resin is the projection area in the direction of the platen of an optically molded product in the case of the core compression method and a value obtained by adding the projection area in the direction of the platen of the runner to the above area in the case of the clamping compression method.

The expression "resin pressure" as used herein indicates a resin pressure obtained by calculating the hydraulic pressure of the injection cylinder from the ratio of the square of the diameter of the hydraulic injection cylinder to the square of the diameter of the screw or a resin pressure measured with a pressure sensor. This value differs according to the design of a molding machine.

Balancing between the resin pressure and the compression pressure means the control (change) of the resin pressure and the compression pressure so that the typical thickness of the cavity should fall within a prescribed range of thickness in the dwelling step (4) after the compression step (3). Stated more specifically, in the case of examples, the compression pressure is set to 64.1 MPa when the resin pressure is 63.3 MPa. The compression pressure is 0.8 MPa larger than the resin pressure. This is based on errors in the measurement accuracies of resistance in the metal mold and molding machine, hydraulic pressure in the molding machine and others. It is not necessary to make the resin pressure equal to the compression pressure but the typical thickness of the cavity (typical thickness of the optically molded product) may be set within a prescribed range of predetermined thickness. The resin pressure and the compression pressure to be well balanced with each other differ according to the design of the metal mold, the shape and size of the optically molded product, the type of molding machine and the type of resin.

The second method will be described in detail with reference to FIG. 5. The structure of FIG. 5 is basically the same as that of FIG. 4 except that a magnet scale 12 for the measurement of the amount of compression for control is attached to the ejector plate.

The magnet scale 12 is installed to measure the moving amount of the ejector plate 7 but may be installed on the compression cylinder or the like. A rotary encoder, linear scale, micrometer, dial gauge, laser displacement gauge, infrared displacement gauge, limit switch or the like may be used in place of the magnet scale 12. Any means is acceptable if it detects the moving amount (the amount of compression) of the mirror surface of a movable mold.

The cavity is expanded more than the volume of an optically molded product of interest. As for the expansion ratio of the cavity, the percentage of the volume of the expanded cavity at the time of injection to the volume of an optically molded product is preferably in the range of 110 to 500% in terms of expansion volume ratio calculated from the above equation from the viewpoints of the surface accuracy (surface deformation or etc.), optical properties (focusing distance, aberration, etc.) and molding ease of an optically molded product. The expansion volume ratio is particularly preferably in the range of 110 to 400%. When the expansion volume ratio is more than 500%, the amount of the exhausted resin becomes large, whereby required compression pressure may become high, the heat resistance of the molten resin may deteriorate, or a molding failure may occur. The expression "amount of compression" caused by this compression denotes a difference in typical thickness between an optically molded product before compression and an optically molded product after compression.

It is important to expand the cavity in limits that a weld line, optical distortion or surface defect is not formed or is allowable. It is difficult to completely eliminate a weld line, optical distortion or surface defect which is formed before compression by any means.

The compression step begins after the resin is injected into the cavity in the injection step.

Figure 6:
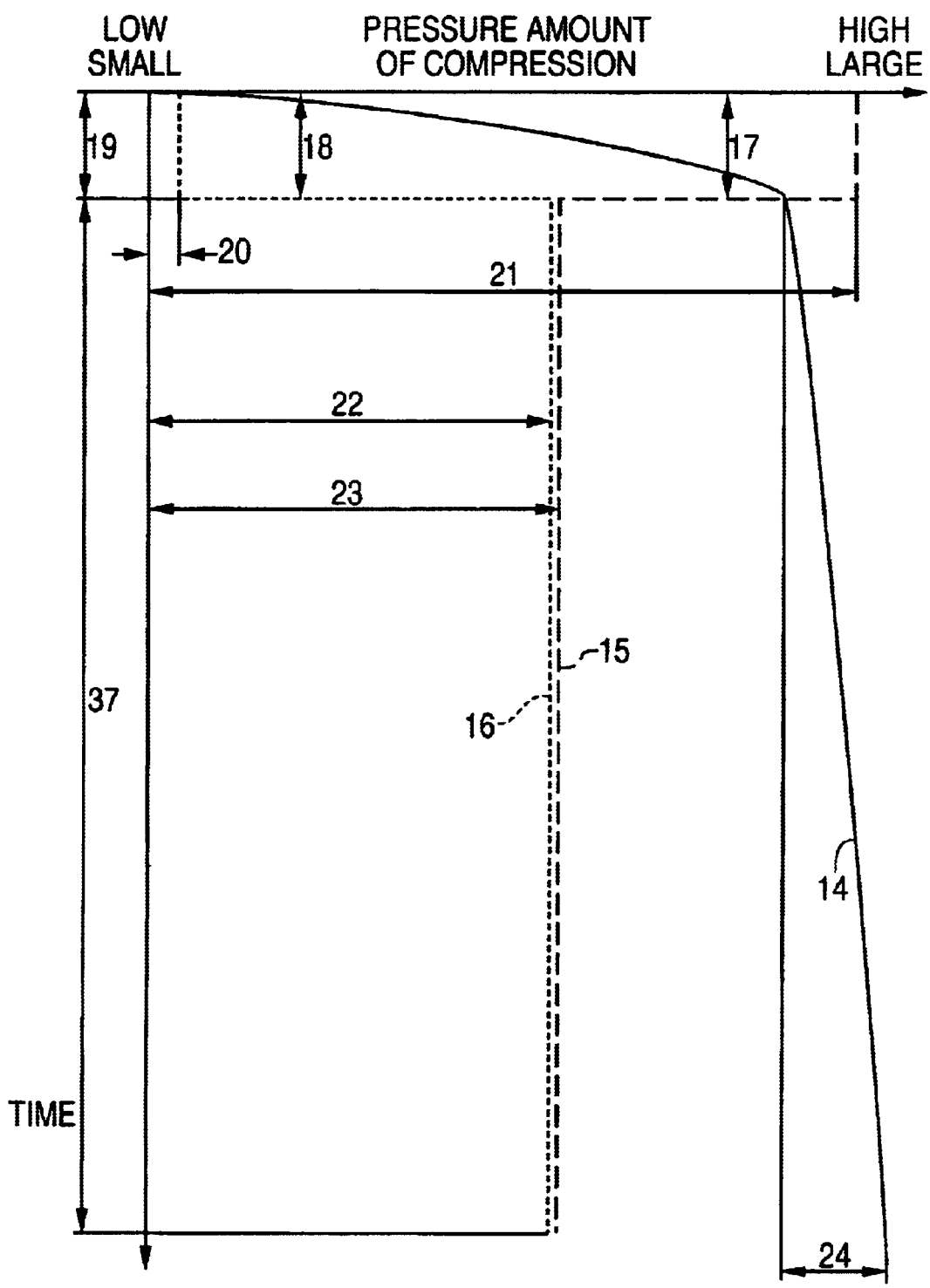
FIG. 6 is a diagram showing the relationship among the amount of compression, compression pressure and resin pressure.

As shown in FIG. 6, the cavity is compressed to a predetermined thickness by setting the resin pressure 20 to a value smaller than the compression pressure 21 in the compression step 19. The typical thickness of the cavity (typical thickness of an optically molded product) is compressed to a predetermined thickness by the time of this compression step, the resin pressure and the compression pressure. The time of the compression step which differs according to the type of filling resin and molding conditions is preferably 5 seconds or less. When this time is longer than 5 seconds, the molten resin is cooled with the result of an increase in viscosity, thereby requiring an extremely high compression pressure. A distortion may remain in the thin portion of an optically molded product due to this high compression pressure.

Thereafter, the resin pressure 22 and the compression pressure 23 are well balanced to proceed to the dwelling step 37. At this point, a mirror surface 2 on a movable side may contact a mirror surface 1 on a fixed side due to the relationship among the resin pressure 22, the compression pressure 23 and the time 19 of the compression step. This takes place, for example, when the time 19 of the compression step is too long or when the compression pressure 21 is large. When these mirror surfaces contact each other, they are broken and cannot be used. To avoid contact between the mirror surfaces, it is desired to set the space 6 between the compression control rod and the die set to a value 0.2 to 0.6 mm smaller than the thickness of the obtained product.

Figure 7:
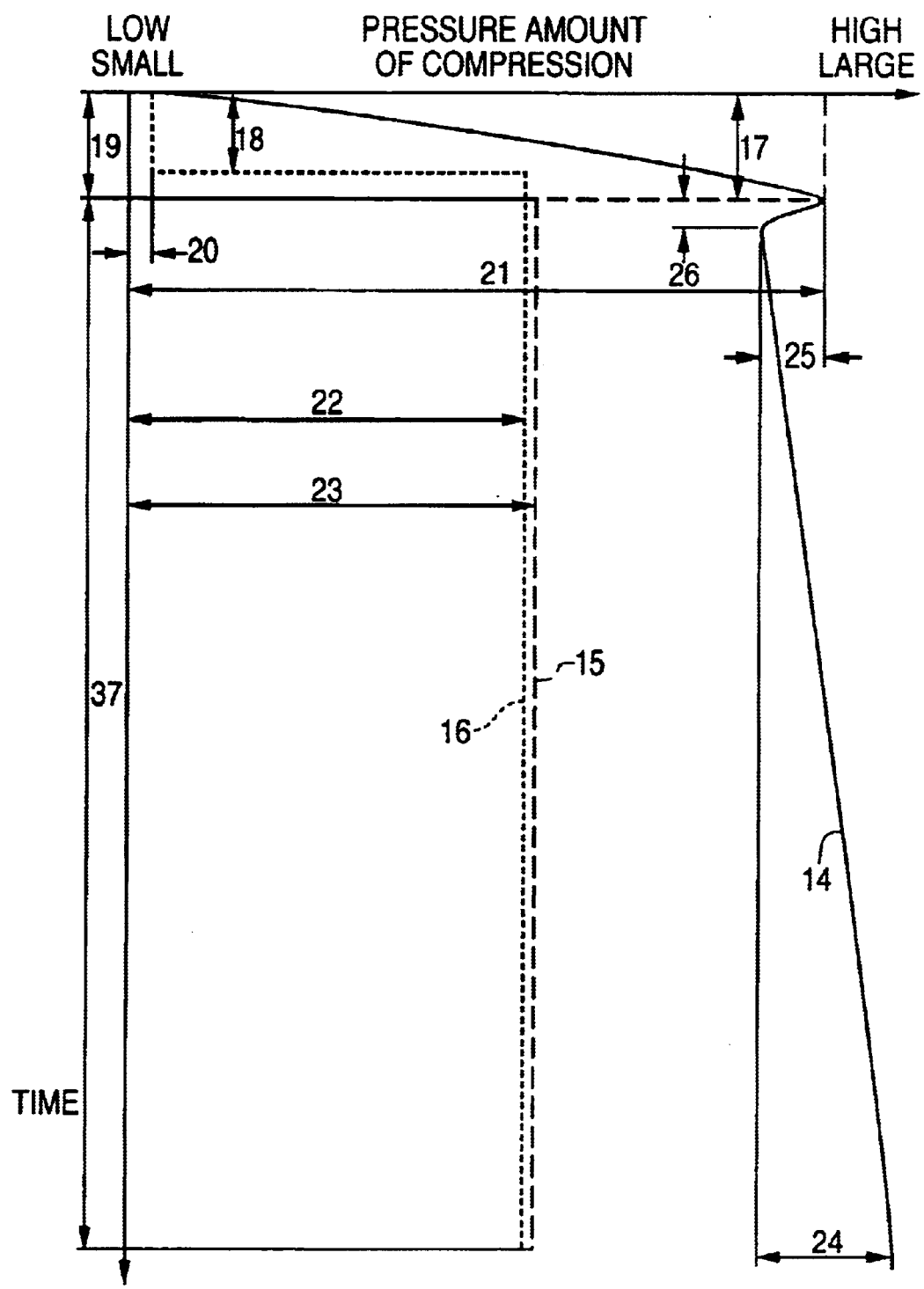
FIG. 7 is a diagram showing the relationship among the amount of compression, compression pressure and resin pressure when the cavity is excessively compressed by 20 to 200 $\mu$m more than the prescribed thickness and returned to the prescribed thickness by controlling resin pressure and compression pressure.

In the compression step 19, as shown in FIG. 7, it is desirable that the cavity should be compressed excessively to a value 200 $\mu$m (preferably 20 to 180 $\mu$m) smaller than the predetermined thickness and returned to the predetermined thickness by controlling the resin pressure 20, the resin pressure time 18 in the compression step, the compression pressure 21 and the compression pressure time 17 in the compression step. As an illustrative example, the time 17 for reducing the compression pressure and the time 18 for raising the resin pressure may be delayed to set these values. By returning the cavity to the predetermined thickness, an excessive pressure applied to the thin portion of the molded product is released, whereby a uniform pressure is applied to the whole molded product. When the amount of return from compression 25 is in the range of 20 to 200 $\mu$m, surface accuracy improves and optical distortion decreases. When the amount is 200 $\mu$m or more, molding stability such as the stability of lens diopter deteriorates.

As described above, in the second method of the present invention, the compression pressure can be controlled in the dwelling step as well. In FIG. 6 and FIG. 7, the resin pressure 22 in the dwelling step is hardly transmitted to the inside of the cavity because the sprue and the gate are gradually solidified by the progress of cooling, the compression pressure 23 exceeds the resin pressure 22, and the amount of compression gradually increases to width 24. The amount of compression gradually also increases to width 24 by the shrinkage of the resin. A time change in the amount of compression causes variations of curvature radius in a thin portion which has already been solidified and a thick portion which is being solidified.

Figure 8:
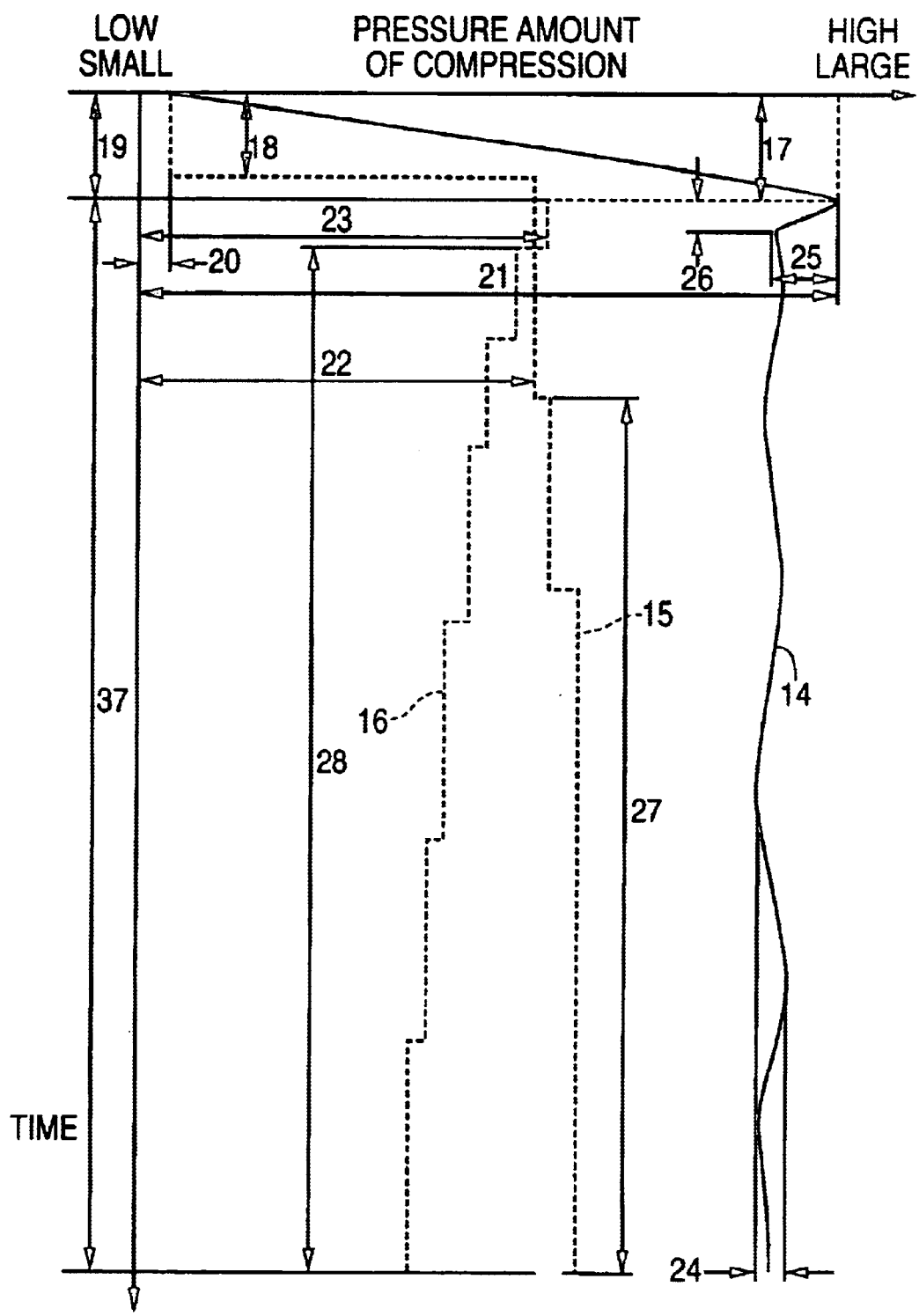
FIG. 8 is a diagram showing the relationship among the amount of compression, compression pressure and resin pressure when resin pressure is increased and compression pressure is reduced in multiple stages along with the cooling step.

As shown in FIG. 8, the resin pressure 27 and the compression pressure 28 are balanced in multiple stages along with the progress of cooling to control a change in the typical thickness of the cavity, that is, a change width 24 in the amount of compression (a change in the typical thickness of the cavity will be referred to as "a change width in the amount of compression" hereinafter) to 100 $\mu$m or less, preferably 50 $\mu$m or less. This makes it possible to achieve a uniform curvature radius from the center portion to the peripheral portion of the molded product. Describing how to set the change width, the measurement value of a compression measuring instrument when the typical thickness of the cavity reaches a predetermined thickness is taken as 0. When the amount of compression increases and the typical thickness of the cavity decreases, the resin pressure is increased or the compression pressure is reduced. When the amount of compression decreases and the typical thickness of the cavity increases, the resin pressure is reduced or the compression pressure is increased. The measurement of the amount of compression is carried out with a compression measuring instrument such as the above magnet scale. To simplify this setting, a loop circuit is preferably used to feedback the amount of displacement of the magnet scale or the like to the setting of the resin pressure and the compression pressure of the molding machine.

EXAMPLES

The following examples are given to further illustrate the present invention.

The evaluation items and evaluation methods of an optically molded product in examples and comparative examples will be described hereinunder.

(1) Refractive Power and Curvature Radius

The measurement of curvature radius is evaluated using the OMS-401 Moiré laser interferometer of Rotlex Co., Ltd. The refractive power is evaluated by converting the mirror surface of a metal mold used and the curvature radius of an optically molded product (lens in this case) into refractive power diopter at a refractive index of 1.586 from the following equation. The smaller the difference in refractive power between the mirror surface and the optically molded product, the better the obtained optically molded product becomes.

refractive power=586/(curvature radius)

The unit of curvature radius is mm.

(2) Surface Accuracy

The surface accuracy is evaluated using the OMS-401 Moiré laser interferometer of Rotlex Co., Ltd. The surface accuracy is evaluated based on the following five criteria.
5 The shift of a Moiré interference fringe is not observed.
4 The shift of a Moiré interference fringe is 25% or less of an interval between interference fringes.
3 The shift of a Moiré interference fringe is 50% or less of an interval between interference fringes.
2 The shift of a Moiré interference fringe is 100% or less of an interval between interference fringes.
1 The shift of a Moiré interference fringe is more than 100% of an interval between interference fringes.

(3) Observation of Fluorescent Lamp

Figure 9:
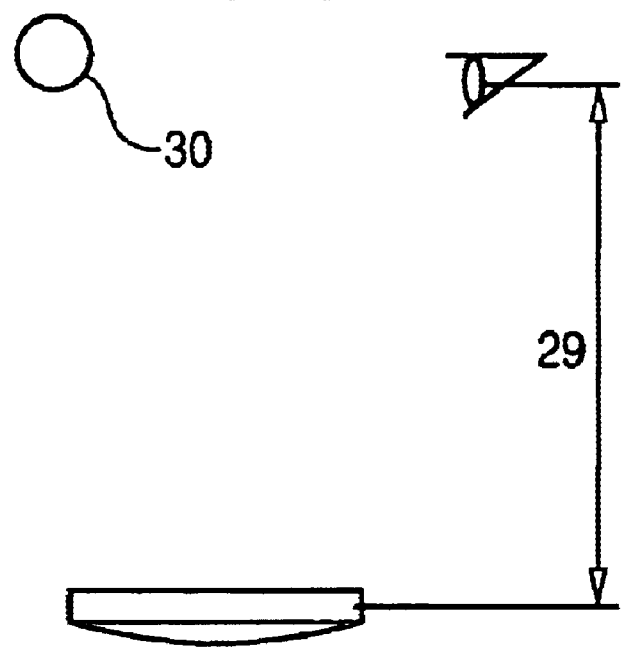
FIG. 9 is a schematic diagram showing the positional relationship among the eye, sample and fluorescent lamp at the time of the evaluation of the fluorescent lamp.

The observation of a fluorescent lamp is carried out by keeping a lens 30 cm away from the eye in a downward direction 29 as shown in FIG. 9 and observing an image reflected from a straight pipe 30 W fluorescent lamp 30 located about 15 cm away from the eye and above the lens at almost the same height as the eye. The image is evaluated based on the following 5 criteria.
5 The image of the fluorescent lamp is a smooth and uniform curve.
4 The image of the fluorescent lamp is smooth but the curvature radius changes at 2 places or less.
3 The image of the fluorescent lamp is smooth but the curvature radius changes at 4 places or less.
2 The image of the fluorescent lamp bends at 2 places or less.
1 The image of the fluorescent lamp bends at more than 2 places.

(4) Observation of Depolarizing Plate (Optical Distortion and Weld Line)

Figure 10:
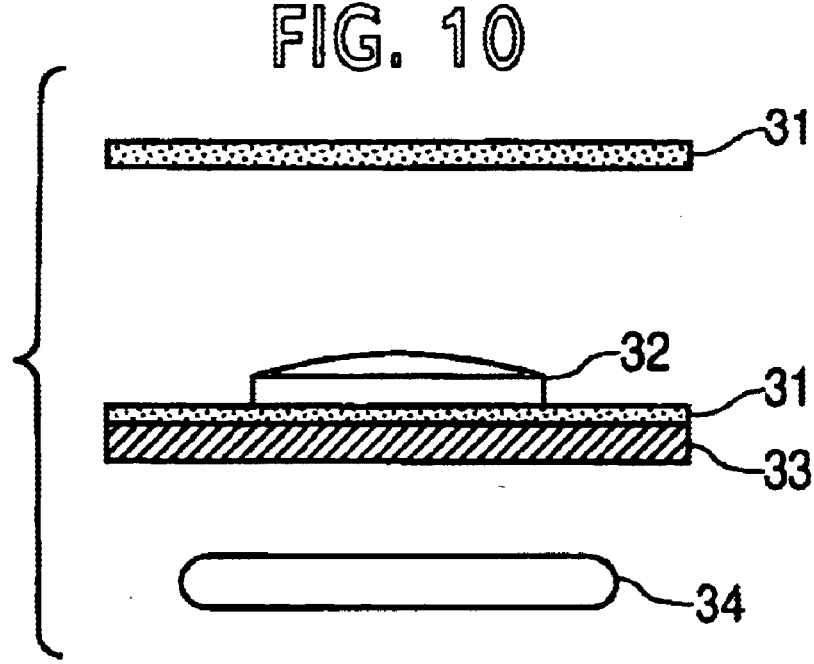
FIG. 10 is a schematic diagram showing the positional relationship between the structure of a distortion inspection device and a sample.

An optical distortion and weld line are evaluated and measured for their lengths using a polariscope (PS-5 of Riken Keiki Co., Ltd.). As for measurement with a polariscope, light from a fluorescent lamp 34 (30 W annular fluorescent lamp) diverged by frosted glass 33 is evaluated by placing an optically molded product 32 between two polarizing plates 31 whose interval is about 15 cm and whose polarization planes are parallel to each other as shown in FIG. 10. The evaluation is carried out based on the following criteria.
5 No interference fringes are existent in the used portion of the lens.
4 An interference fringe which is shifted 0.5 the wavelength is observed in the used portion of the lens.
3 One interference fringe which is shifted 1 the wavelength is observed in the used portion of the lens.
2 Two interference fringes which are shifted 1 the wavelength are observed in the used portion of the lens.
1 More than two interference fringes which are shifted 1 the wavelength are observed in the used portion of the lens.

Figure 11:
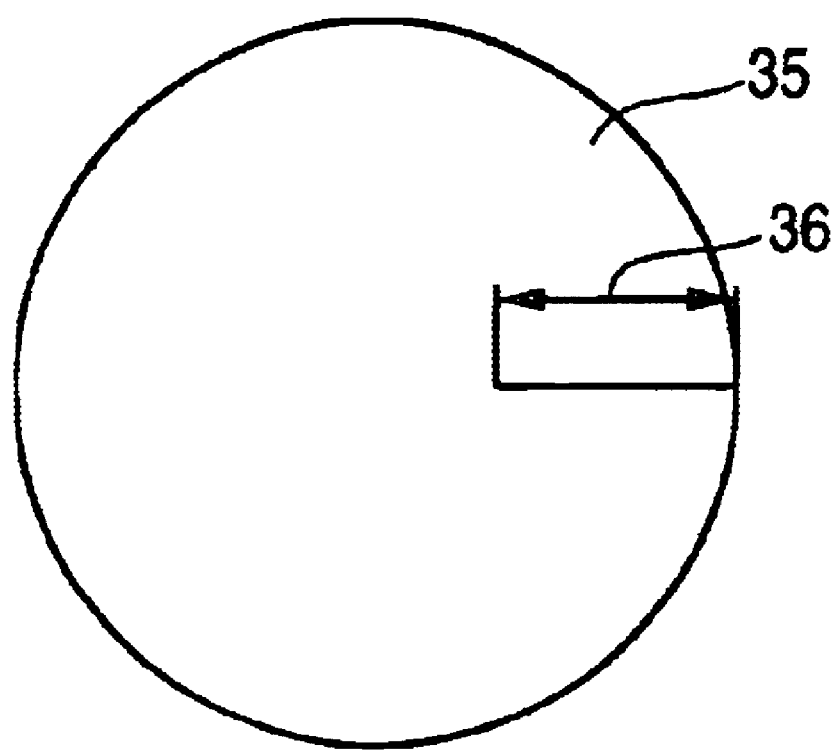
FIG. 11 is a diagram typically showing a lens having a weld line.

The used portion of the lens described above denotes a portion of 70 mm from the center of the lens having an outer diameter of 77.5 mm in the examples. The length 36 of the weld line shown in FIG. 11 is measured with a caliper (CS-S15M of Mitsutoyo Co., Ltd.).

(5) Amount of Compression

The amount of compression is measured with a magnet scale (LH-20B of Sony Corporation) installed on the molding compression cylinder.

Example 1

0.3 part by weight of 2-(2'-hydroxy-5'-t-octyl)-benzotriazole as an ultraviolet light absorber, 0.03 part by weight of tris(nonylphenyl)phosphite as a heat stabilizer and 0.2 part by weight of monoglyceride stearate as a releasing agent were blended with 100 parts by weight of a polycarbonate resin having a viscosity average molecular weight of 22,500 synthesized from bisphenol A and phosgene, and the obtained blend was formed into the following polycarbonate resin minus spectacle lens (concave lens) by injection compression molding using the injection molding machine (SYCAPSG220) of Sumitomo Heavy Industries, Ltd. and a core compression mold.

| | |
|---|---|
| curvature radius of front side | 293.00 mm |
| curvature radius of rear side | −73.25 mm |
| thickness of center portion | 1.5 mm |
| edge thickness | 10.0 mm |
| outer diameter of lens | 77.5 mm |
| focusing distance at apex of rear side | −166.67 mm |

The main molding conditions at this point were as follows.

| | |
|---|---|
| temperature of cylinder | 280° C. to 300° C. |
| temperature of metal mold | 125° C. |
| molding cycle | 240 seconds |

The movable lens mold was moved back, the cavity was expanded to a lens center thickness of 7.6 mm (expansion volume ratio of 215%) before injection, the resin was injected into the cavity, the movable lens mold was compressed when the resin pressure became 30 MPa until the compression control rod contacted the die set and the lens center thickness became 1.5 mm as shown in FIG. 5, and an excess of the resin was returned into the injection cylinder. The return of an excess of the resin into the cylinder was confirmed from an increase in the measurement value of an injection stroke measuring instrument in a direction opposite to that at the time of injection. Thereafter, a concave lens molded product was taken out after the completion of cooling. No weld line was observed in the obtained concave lens when measured with a polariscope.

Comparative Example 1

A similar polycarbonate resin minus spectacle lens (concave lens) was formed by compression molding under the same conditions as in Example 1 except that the cavity had a lens center thickness of 1.6 mm before injection and an excess of the resin was compressed without returning into the injection cylinder. The obtained concave lens molded product had a weld line of 25 to 35 mm and low quality as a lens.

Example 2

0.3 part by weight of 2-(2'-hydroxy-5'-t-octyl)-benzotriazole as an ultraviolet light absorber, 0.03 part by weight of tris(nonylphenyl)phosphite as a heat stabilizer and 0.2 part by weight of monoglyceride stearate as a releasing agent were blended with 100 parts by weight of a polycarbonate resin having a viscosity average molecular weight of 22,500 synthesized from bisphenol A and phosgene, and the obtained blend was formed into the following spectacle concave lens by injection compression molding using the injection molding machine (SYCAPSG220) of Sumitomo Heavy Industries, Ltd. and a core compression mold.

| | |
|---|---|
| curvature radius of front side | 293.00 mm |
| curvature radius of rear side | −73.25 mm |
| thickness of center portion | 1.5 mm |
| thickness of peripheral portion | 10.0 mm |
| outer diameter of lens | 77.5 mm |
| focusing distance at apex of rear side | −166.67 mm |

The main molding conditions at this point were as follows.

| | |
|---|---|
| temperature of cylinder | 280° C. to 300° C. |
| temperature of metal mold | 125° C. |
| molding cycle | 240 seconds |
| resin pressure before compression | 56.84 MPa |

The movable lens mold was moved back, the cavity was expanded to a lens center thickness of 7.6 mm (expansion volume ratio of about 215%) before injection, the resin was injected into the cavity, the movable lens mold was compressed when the resin pressure became 56.8 MPa until the compression control rod contacted the die set and the lens center thickness became 1.5 mm as shown in FIG. 5, and an excess of the resin was returned into the injection cylinder. The return of an excess of the resin into the cylinder was confirmed from an increase in the measurement value of an injection stroke measuring instrument in a direction opposite to that at the time of injection. Thereafter, a polycarbonate resin minus spectacle lens (concave lens) molded product was taken out after the completion of cooling.

This was a high-accuracy spectacle lens having no such defects as a surface defect, optical distortion and weld line when it was observed with a polarizing plate. The standard deviation of lens refractive power diopter was satisfactory at 0.003.

Comparative Example 2

A similar concave lens was formed by compression molding under the same conditions as in Example 2 except that the cavity had a lens center thickness of 1.6 mm before injection and an excess of the resin was compressed without returning into the injection cylinder. Line disorder was seen in an image reflected from a fluorescent lamp and an optical distortion was observed in the peripheral portion of the lens. A 25 to 35 mm long weld line was confirmed. The standard deviation of refractive power diopter was 0.062. This lens was inferior in quality.

Example 3

Molding was carried out under the same conditions as in Example 2 except that a polycarbonate resin plus spectacle lens (convex lens) having the following specifications was molded.

| | |
|---|---|
| curvature radius of front surface | 97.67 mm |
| curvature radius of rear surface | −146.50 mm |
| thickness of center portion | 3.7 mm |
| edge thickness | 1.0 mm |
| outer diameter of lens | 77.5 mm |
| focusing distance at apex of rear side | 500.0 mm |
| injected resin pressure before compression | 56.8 MPa |

The movable lens mold was moved back, the cavity was expanded to a lens center thickness of 5.1 mm (expansion volume ratio of about 160%) before injection, the resin was injected into the cavity, the movable lens mold was compressed when the resin pressure became 56.8 MPa until the compression control rod contacted the die set and the lens center thickness became 3.7 mm as shown in FIG. 5, and an excess of the resin was returned into the injection cylinder. The return of an excess of the resin into the cylinder was confirmed from an increase in the measurement value of an injection stroke measuring instrument in a direction opposite to that at the time of injection.

Thereafter, a convex lens molded product was taken out after it was cooled while dwelling. Such defects as the optical distortion and surface defect of the center portion of the lens were not observed in the obtained convex lens with a polarizing plate. The standard deviation of refractive power diopter was satisfactory at 0.004. Thus, a high-accuracy convex lens was obtained.

Comparative Example 3

A similar convex lens was formed by compression molding under the same conditions as in Example 3 except that the cavity had a lens center thickness of 3.8 mm before injection and an excess of the resin was compressed without returning into the injection cylinder.

A large distortion and a pattern based on the flow line of the resin were observed in a portion near the gate and an optical distortion was observed in the center portion when the obtained convex lens was observed with a polarizing plate. The standard deviation of refractive power diopter was 0.072. Thus, the obtained lens had quality problems.

Example 4

0.3 part by weight of 2-(2'-hydroxy-5'-t-octyl)-benzotriazole as an ultraviolet light absorber, 0.03 part by weight of tris (nonylphenyl) phosphite as a heat stabilizer and 0.2 part by weight of monoglyceride stearate as a releasing agent were blended with 100 parts by weight of a polycarbonate resin having a viscosity average molecular weight of 22,500 synthesized from bisphenol A and phosgene, and the obtained blend was formed into the following spectacle concave lens by injection compression molding using the injection molding machine (SYCAPSG220) of Sumitomo Heavy Industries, Ltd. and a core compression mold.

| | |
|---|---|
| curvature radius of front side | 293.0 mm |
| curvature radius of rear side | −73.25 mm |
| thickness of center portion | 1.5 mm |
| edge thickness | 10.0 mm |
| outer diameter of lens | 77.5 mm |
| focusing distance at apex of rear side | −166.67 mm |

The main molding conditions at this point were as follows.

| | |
|---|---|
| temperature of cylinder | 280° C. to 300° C. |
| temperature of metal mold | 125° C. |
| molding cycle | 240 seconds |

The movable lens mold was moved back, the cavity was expanded to a lens center thickness of 7.6 mm (expansion volume ratio of about 215%) before injection, and the resin was injected into the cavity and molded by the method shown in FIG. 6 when the resin pressure became 56.8 MPa. In the compression step, the movable lens mold was compressed to a lens center thickness of 1.5 mm and an excess of the resin was returned into the injection cylinder. At this point, the compression control rod and the die set were not contacted to each other. This was confirmed by checking no red chalk adhered to the die set after the red chalk was applied to the end of the compression control rod. The return of an excess of the resin into the cylinder was confirmed from an increase in the measurement value of the injection stroke measuring instrument in a direction opposite to that at the time of injection. The resin pressure in the compression step was 12.4 MPa, its application time was 2.14 seconds, the compression pressure was 102.56 MPa and its application time was 2.14 seconds. Thereafter, the resin pressure was set to 63.3 MPa and the compression pressure was set to 64.1 MPa in the dwelling step to balance both pressures. The amount of compression was changed to 165 μm (change width in the amount of compression) in the dwelling step in a direction that an optically molded product became thin. Thereafter, a polycarbonate resin minus spectacle lens (concave lens) was taken out after the completion of cooling. The evaluation results of the obtained polycarbonate resin minus spectacle lens are shown in Table 1.

Comparative Example 4

The metal mold used in Example 4 was used, the compression amount control space was set to 1 mm, and the movable mold was opened to a lens center thickness of 2.5 mm which was 1 mm larger than the predetermined lens center thickness of 1.5 mm before injection. In the injection step, a resin was injected in an amount of 100 to 105% the volume of the cavity. In this case, the resin did not return into the cylinder. This was confirmed from not increasing in the measurement value of the injection stroke measuring instrument in a direction opposite to that at the time of injection. Thereafter, the cavity was compressed by applying a compression force of 102.56 MPa and contacting the compression control rod to the die set on the fixed side. Contact between the compression control rod and the die set was confirmed by checking the adhesion of red chalk to the die set after the red chalk was applied to the end of the compression rod.

A similar polycarbonate resin minus spectacle lens (concave lens) was formed by compression molding under the same conditions as in Example 4 except the above. The evaluation results of the obtained polycarbonate resin minus spectacle lenses are shown in Table 1.

Example 5

The movable lens mold was compressed by 100 μm (amount of return from compression) more than a lens center thickness of 1.5 mm and an excess of the resin was returned into the injection cylinder in the compression step of Example 4. At this point, the compression control rod and the die set were not contacted to each other. The resin pressure in the compression step was 12.4 MPa, its application time was 2.10 seconds, the compression pressure was 102.56 MPa and its application time was 2.16 seconds. Thereafter, the resin pressure was set to 63.3 MPa and the compression pressure was set to 64.1 MPa in the dwelling step to balance both pressures. The amount of compression was changed by 155 μm (change width in the amount of compression) in a direction that an optically molded product became thin in the dwelling step. Thereafter, a polycarbonate resin minus spectacle lens (concave lens) was taken out after the completion of cooling.

A similar polycarbonate resin minus spectacle lens was formed by compression molding under the same conditions as in Example 4 except the above. The evaluation results of the obtained polycarbonate resin minus spectacle lenses are shown in Table 1.

Example 6

The movable lens mold was compressed by 100 μm (amount of return from compression) more than a lens center thickness of 1.5 mm and an excess of the resin was returned into the injection cylinder in the compression step of Example 4. At this point, the compression control rod and the die set were not contacted to each other. The resin pressure in the compression step was 12.4 MPa, its application time was 2.10 seconds, the compression pressure was 102.56 MPa and its application time was 2.16 seconds. Thereafter, the resin pressure was set to 63.3 MPa and the compression pressure was set to 64.1 MPa in the dwelling step to balance both pressures. The resin pressure was gradually increased from 63.3 MPa to 68.7 MPa stepwise at intervals of 2 to 90 seconds. The compression pressure was balanced with the resin pressure and then gradually reduced from 64.1 MPa to 42.5 MPa stepwise at intervals of 2 to 60 seconds. The amount of compression was changed by 35 μm (change width in the amount of compression) in the dwelling step. A polycarbonate resin minus spectacle lens (concave lens) was taken out after the completion of cooling.

A similar polycarbonate resin minus spectacle lens was formed by compression molding under the same conditions as in Example 4 except the above. The evaluation results of the obtained polycarbonate resin minus spectacle lenses are shown in Table 1.

Example 7

0.3 part by weight of 2-(2'-hydroxy-5'-t-octyl)-benzotriazole as an ultraviolet light absorber, 0.03 part by weight of tris(nonylphenyl)phosphite as a heat stabilizer and 0.2 part by weight of monoglyceride stearate as a releasing agent were blended with 100 parts by weight of a polycarbonate resin having a viscosity average molecular weight of 22,500 synthesized from bisphenol A and phosgene, and the obtained blend was formed into following spectacle convex lens by injection compression molding using the injection molding machine (SYCAPSG220) of Sumitomo Heavy Industries, Ltd. and a core compression mold.

| | |
|---|---:|
| curvature radius of front side | 97.67 mm |
| curvature radius of rear side | −146.50 mm |
| thickness of center portion | 3.7 mm |
| edge thickness | 1.0 mm |
| outer diameter of lens | 77.5 mm |
| focusing distance at apex of rear side | 500.0 mm |
| injected resin pressure before compression | 56.8 MPa |

The movable lens mold was moved back, the cavity was expanded to a lens center thickness of 5.1 mm (expansion volume ratio of about 160%) before injection, and the resin was injected into the cavity and molded by the method shown in FIG. 6 when the resin pressure became 56.8 MPa. In the compression step, the movable lens mold was compressed to a lens center thickness of 3.7 mm and an excess of the resin was returned into the injection cylinder. At this point, the compression control rod and the die set were not contacted to each other. This was confirmed by checking no red chalk adhered to the die set after the red chalk was applied to the end of the compression control rod. The return of an excess of the resin into the cylinder was confirmed from an increase in the measurement value of the injection stroke measuring instrument in a direction opposite to that at the time of injection. The resin pressure in the compression step was 18.6 MPa, its application time was 0.42 seconds, the compression pressure was 102.56 MPa and its application time was 0.42 seconds. Thereafter, the resin pressure was set to 63.3 MPa and the compression pressure was set to 64.1 MPa in the dwelling step to balance both pressures. Thereafter, a polycarbonate resin plus spectacle lens (convex lens) was taken out after the completion of cooling. The amount of compression was changed to 135 μm (change width in the amount of compression) in the dwelling step in a direction that an optically molded product became thin. The evaluation results of the obtained polycarbonate resin plus spectacle lens are shown in Table 1.

Comparative Example 5

The metal mold used in Example 4 was used, the compression amount control space was set to 1 mm, and the movable mold was opened to a lens center thickness of 4.7 mm which was 1 mm larger than the predetermined lens center thickness of 3.7 mm before injection. In the injection step, a resin was injected in an amount of 100 to 105% the volume of the cavity. In this case, the resin did not return into the cylinder. This was confirmed from not increasing in the measurement value of the injection stroke measuring instrument in a direction opposite to that at the time of injection. Thereafter, the cavity was compressed by applying a compression force of 102.56 MPa and contacting the compression control rod to the die set on the fixed side. Contact between the compression control rod and the die set was confirmed by checking the adhesion of red chalk to the die set after the red chalk was applied to the end of the compression rod.

A similar polycarbonate resin plus spectacle lens (convex lens) was formed by compression molding under the same conditions as in Example 7 except the above. The evaluation results of the obtained polycarbonate resin plus spectacle lenses are shown in Table 1.

Example 8

The movable lens mold was compressed by 100 μm (amount of return from compression) more than a lens center thickness of 3.7 mm and an excess of the resin was returned into the injection cylinder in the compression step of Example 7. At this point, the compression control rod and the die set were not contacted to each other. The resin pressure in the compression step was 18.6 MPa, its application time was 0.39 seconds, the compression pressure was 102.56 MPa and its application time was 0.44 seconds. Thereafter, the resin pressure was set to 63.3 MPa and the compression pressure was set to 64.1 MPa in the dwelling step to balance both pressures. The amount of compression was changed by 145 μm (change width in the amount of compression) in a direction that an optically molded product became thin in the dwelling step. Thereafter, a polycarbonate resin plus spectacle lens (convex lens) was taken out after the completion of cooling. The evaluation results of the obtained polycarbonate resin plus spectacle lens are shown in Table 1.

Example 9

The movable lens mold was compressed by 100 μm (amount of return from compression) more than a lens center thickness of 3.7 mm and an excess of the resin was returned into the injection cylinder in the compression step of Example 7. At this point, the compression control rod and the die set were not contacted to each other. The resin pressure in the compression step was 18.6 MPa, its application time was 0.39 seconds, the compression pressure was 102.56 MPa and its application time was 0.44 seconds. Thereafter, the resin pressure was set to 63.3 MPa and the compression pressure was set to 64.1 MPa in the dwelling step to balance both pressures. The resin pressure was gradually increased from 63.3 MPa to 68.7 MPa stepwise at intervals of 2 to 90 seconds. The compression pressure was balanced with the resin pressure and then gradually reduced from 64.1 MPa to 42.5 MPa stepwise at intervals of 2 to 60 seconds. The amount of compression was changed by 35 μm (change width in the amount of compression) in a direction that an optically molded product became thin in the dwelling step. A polycarbonate resin plus spectacle lens (convex lens) was taken out after the completion of cooling. The evaluation results of the obtained polycarbonate resin plus spectacle lens are shown in Table 1.

TABLE 1

| | evaluation of Moiré laser interferometer | | | | | | | |
|---|---|---|---|---|---|---|---|---|
| | curvature radius (mm) | | | | refractive power | | | |
| | mold mirror surface | | lens | | mold mirror surface | | lens | |
| | fixed side | movable side | fixed side | movable side | fixed side | movable side | fixed side | movable side |
| Ex.4 | 293.00 | 73.25 | 290.10 | 72.89 | 2.00 | 8.00 | 2.02 | 8.04 |
| Ex.5 | 293.00 | 73.25 | 291.54 | 73.16 | 2.00 | 8.00 | 2.01 | 8.01 |
| Ex.6 | 293.00 | 73.25 | 291.54 | 73.25 | 2.00 | 8.00 | 2.01 | 8.00 |
| C.Ex.4 | 293.00 | 73.25 | 285.85 | 72.61 | 2.00 | 8.00 | 2.05 | 8.07 |
| Ex.7 | 97.67 | 146.50 | 97.99 | 145.05 | 6.00 | 4.00 | 5.98 | 4.04 |
| Ex.8 | 97.67 | 146.50 | 97.67 | 145.77 | 6.00 | 4.00 | 6.00 | 4.02 |
| Ex.9 | 97.67 | 146.50 | 97.67 | 146.13 | 6.00 | 4.00 | 6.00 | 4.01 |
| C.Ex.5 | 97.67 | 146.50 | 98.49 | 143.98 | 6.00 | 4.00 | 5.95 | 4.07 |

| | evaluation of Moiré laser interferometer surface accuracy | | observation of fluorescent lamp | | observation with polarizing plate | |
|---|---|---|---|---|---|---|
| | fixed side | movable side | fixed side | movable side | distortion | weld line |
| Ex.4 | 4 | 4 | 3 | 4 | 3 | nonexistent |
| Ex.5 | 5 | 5 | 4 | 5 | 4 | nonexistent |
| Ex.6 | 5 | 5 | 5 | 5 | 4 | nonexistent |
| C.Ex.4 | 1 | 2 | 1 | 3 | 1 | 20 to 30 mm |
| Ex.7 | 4 | 4 | 3 | 3 | 4 | nonexistent |
| Ex.8 | 5 | 4 | 3 | 4 | 4 | nonexistent |
| Ex.9 | 5 | 5 | 5 | 5 | 5 | nonexistent |
| C.Ex.5 | 1 | 1 | 1 | 1 | 2 | nonexistent |

Ex.: Example
C.Ex.: Comparative Example

Effect of the Invention

An optically molded product free from a weld line can be produced by the injection compression molding method of the present invention using a metal mold having an extremely simple structure and a method of molding thereof. Therefore, the method of the present invention is advantageously used for the injection compression molding of a spectacle lens, particularly useful for the injection compression molding of a polycarbonate resin minus spectacle lens.

An optically molded product free from an optical distortion and excellent in surface accuracy can be produced stably by the molding method of the present invention.

The molding method of the present invention makes it possible to produce multiple types and a great quantity of spectacle lenses at the same time with a simple apparatus.

What is claimed is:

1. A spectacle lens comprising:
   (i) a finish lens produced by injection molding of an aromatic polycarbonate,
   (ii) having substantially no weld line, and
   (iii) having a surface accuracy in which a shift of a Moire interference fringe is not observed, or the shift is 25% or less an interval between interference fringes.

2. The spectacle lens of claim 1, wherein (iv) based on an observation of a fluorescent lamp, an image of the fluorescent lamp is a smooth and uniform curve, or the image is smooth but the curvature radius changes at 4 places or less.

3. The spectacle lens of claim 1, wherein (iv) based on an observation of a fluorescent lamp, an image of the fluorescent lamp is a smooth and uniform curve, or the image is smooth but the curvature radius changes at 2 places or less.

4. The spectacle lens of claim 1, wherein (v) based on an observation of a depolarizing plate, no interference fringes are existent in a used portion of the lens, or an interference fringe which is shifted 0.5 the wavelength is observed in the used portion of lens, or one interference fringe which is shifted 1 the wavelength is observed in the used portion of lens.

5. The spectacle lens of claim 1, wherein (v) based on an observation of a depolarizing plate, no interference fringes are existent in a used portion of the lens, or an interference fringe which is shifted 0.5 the wavelength is observed in the used portion of lens.

* * * * *